(12) United States Patent
Kim

(10) Patent No.: US 6,975,432 B2
(45) Date of Patent: Dec. 13, 2005

(54) COMMUNICATION CONTROL SYSTEM AND METHOD USING COMMUNICATION NETWORK

(75) Inventor: Hyun-Joon Kim, Kyungki-do (KR)

(73) Assignee: LG Electronics Inc., Seoul (KR)

(*) Notice: Subject to any disclaimer, the term of this patent is extended or adjusted under 35 U.S.C. 154(b) by 867 days.

(21) Appl. No.: 09/872,443

(22) Filed: May 31, 2001

(65) Prior Publication Data

US 2002/0051188 A1    May 2, 2002

(30) Foreign Application Priority Data

Jun. 3, 2000  (KR) ............... 10-2000-0030594

(51) Int. Cl.[7] .............................................. H04D 1/00
(52) U.S. Cl. ................ 358/406; 358/405; 358/426.09; 358/437
(58) Field of Search ................... 379/100.01; 358/400, 358/1.15, 406, 404, 407, 405, 426.01, 426.02, 358/426.08, 426.09, 426.15, 426.16, 434, 358/437, 440, 443

(56) References Cited

U.S. PATENT DOCUMENTS 3,648,256 A * 3/1972 Paine et al. ................ 709/230
6,323,962 B1 * 11/2001 Itoh et al. ................... 358/468
6,721,307 B1 * 4/2004 Kim ........................... 370/352
2001/0033642 A1 * 10/2001 Abrishami et al. .... 379/100.01

FOREIGN PATENT DOCUMENTS

JP        04287478    * 10/1992    ............ H04N 1/32

* cited by examiner

Primary Examiner—Jerome Grant, II
(74) Attorney, Agent, or Firm—Lee, Hong, Degerman, Kang & Schmadeka

(57) ABSTRACT

A communication control system and method provides communication over the Internet between a first user having a first communication device, such as IP phone or computer, and a second user having a second communication device. The communication control system provides a plurality of user selectable communication options, such as voice communication, chatting, e-mail and fax. The communication control system interfacing with the second communication device to determine whether the second communication device is available to communicate using a first communication option, such as voice communication. The communication control system checking transmission delay of the communication network to determine whether an optimum communication may be achieved using the first communication option. If the first communication option is not feasible due to the transmission anomaly, a second communication option, such as chatting is selected.

21 Claims, 11 Drawing Sheets

Fig. 3a

IN CASE OF BUSINESS NAME

| BUSINESS NAME | ADDRESS | PHONE |
|---|---|---|
| LG ELECTRONICS(HOME APPLIANCE MFG.) | 16 WOOMYUN-DONG, SUCHO-GU | 3497-8726 | www.lge.co.kr   IP PHONE   CHATTING   E-MAIL   FAX

ADVERTISEMENT

Fig. 3b

IN CASE OF PERSONAL NAME

| NAME | ADDRESS | PHONE |
|---|---|---|
| KIM HYUN-JOON | 98 WOOMYUN-DONG, SUCHO-GU | 578-1234 | www.hyunjoon.pe.kr     IP PHONE  CHATTING  E-MAIL  FAX

| KIM HYUN-JOON | 101-1201 WOOMYUN-DONG, SUCHO-GU | 578-1234 | www.khj.pe.kr     IP PHONE  CHATTING  E-MAIL  FAX

ADVERTISEMENT

Fig. 3c

IN CASE OF BUSINESS TYPE

| TYPE>FOOD>RESTAURANT>KOREAN | ADDRESS | PHONE | | |
|---|---|---|---|---|
| HANIL-KWAN | 100 WOOMYUN-DONG, SUCHO-GU | 599-1234 | | |
| www.hanilkwan.co.kr | IP PHONE CHATTING | E-MAIL | FAX | |
| KOOKIL-KWAN | 200 WOOMYUN-DONG, SUCHO-GU | 600-1234 | | |
| www.kookilkwan.co.kr | IP PHONE CHATTING | E-MAIL | FAX | |

ADVERTISEMENT

Fig. 7

| SENDER | MAIL TYPE | DATE & TIME |
|---|---|---|
| www.hjkim.pe.kr | VOICE-MAIL | 2000.2.19.09:00 |
| hjkim@hanmir.net | E-MAIL | 2000.2.19.10:00 |
| STARGATE | CHATTING | 2000.2.19.11:00 |
| (02)571-8900 | FAX | 2000.2.19.12:00 | bw
COMMUNICATION CONTROL SYSTEM AND METHOD USING COMMUNICATION NETWORK

CROSS REFERENCE TO RELATED ART

This application claims the benefit of Korean Patent Application No. 2000-30594, filed on Jun. 3, 2000, which is hereby incorporated by reference in its entirety.

BACKGROUND OF THE INVENTION

1. Field of the Invention

The present invention relates to a communication control system, and more particularly, to a communication control system and method on a communication network or medium, such as the Internet, that enables more convenient and effective use of various communication devices, such as IP telephone, chatting, e-mail, fax, etc.

2. Discussion of the Related Art

The Internet is a global group of computers linked into a huge network so that they can easily share files and communicate with one another. The Internet is one of many interactive devices developed to provide information to various computer users. The state of the Internet is continually evolving and changing both in scope and technology. The Internet has become a super-structure allowing the exchange of information to take place rapidly from almost any location in the world.

Recently, IP phone (Internet Protocol Telephone, and a.k.a. Internet phone) has been introduced, wherein the Internet becomes the transmitting medium so that a party can talk to another other party through IP. Although IP has certain problems of being somewhat inconvenient in its use and to some degree low in its sound quality compared to conventional telephones, its use is being wide spread due to the substantial advantage in the aspect of toll charge. Especially, among the businesses with large numbers of long distance call usage, it is receiving favorable reactions.

Although, in spite of low or no toll charges, the IP telephone is not widely used among general households due to its sound quality problems. It is still being used in forms of connecting software IP telephone through personal computer and making long distance or international calls through gateways provided by service vendors.

The call center products presently being marketed for businesses or store customer services are designed to handle conventional telephone, IP telephone, chatting, e-mail, fax, etc. in a single web page.

In spite of the above explained facts, there have been substantial difficulties in practical use of IP phone due to the lack of technologies that serve to facilitate convenient use of IP phone, chatting, e-mail, fax, etc. The user, after finding out the IP number of the business or the store he wants to communicate with, must input the other party's IP in order to place a call. Since an IP is unfamiliar with and difficult to remember for the general public (especially, in case of IPv6, the string of numbers is too lengthy), it created substantial difficulties. This type of inconvenience in its use will act as an obstacle to the wide spread use of IP telephones among general households in the future.

Furthermore, another deficiency has been a lack of service function that can appropriately switch and change the communication method in accordance with communication environment, which prevented maximization of communication efficiency under given conditions. For example, maximizing the communication efficiency has been made difficult due to the lack of service function that can switch and change to chatting while IP phone is being used if the Internet traffic increases.

SUMMARY OF THE INVENTION

Accordingly, the present invention is directed to a communication control system and method that substantially obviates one or more of the problems due to limitations and disadvantages of the related art.

Therefore, it is one objective of the present invention to provide a communication control system and method that provides the more convenient use of IP telephone, chatting, e-mail, fax, etc. over the Internet.

It is another objective of the present invention to provide a communication control system and method that appropriately and effectively switch and change the communication option in accordance with the communication environment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The communication control system and method that achieve the primary objective of the present invention is comprised of the first process, wherein an IP number search site is provided so that the user may search business names, personal names or business types on the Internet. The second process constitutes service items such as main IP, IP telephone, chatting, e-mail, fax, reservation, etc. that are associated with the corresponding item are displayed when the user selects an item he desires on the search site. The third process wherein a service is provided so that appropriate communication function is attained when the user selects a desired communication option among the service items.

The communication control method that achieves the secondary objective of the present invention is comprised of the first process, wherein the feasibility of phone conversation is checked first when the user selects IP telephone item in the web page of the Internet and then either IP telephone communication service is implemented in the event the transmission speed of the connected communication network is at a level such that the phone conversation is possible, or is switched and changed to a chatting mode in the event that the network is at a level in which phone conversation is not possible. The second process consists of the feasibility of chatting with the other party, which is first checked when the user selects the chatting item in the web page and then the chatting service is implemented. Also, if during chatting the user demands the use of IP telephone, it is returned to the first process. Lastly, the third process constitutes message storage service demanded by the user being implemented when phone conversation with the other party is ascertained as being impossible in the first process, or chatting with the other party is ascertained as being impossible in the second process.

In order to achieve the above object, there is provided a method of communicating between a first user having a first communication device and a second user having a second communication device using a communication control system over a communication network, such as the Internet. The first and the second communication devices include IP phone, analog telephone and computer. The communication control system provides a plurality of communication options. The method comprising the steps of: the communication control system receiving from the first communication device a request indicating that the first user has requested contacting the second user through the communication network using a first communication option from the plurality of communication options; the communication control system interfacing with the second communication device to determine whether the second communication device is available to communicate using the first communication option; the communication control system checking transmission delay of the communication network to determine whether an optimum communication may be achieved using the first communication option; and the communication control system communicating with the second communication device using a second communication option if the first communication option is not feasible due to the transmission anomaly being over a predetermined levels.

According to one aspect of the present invention, the communication control system provides a web site with a search engine to provide information pertaining to the second user including the plurality of communication options to contact the second user. Preferably, the plurality of communication options comprises audio communication, chatting, e-mail and fax.

According to another aspect of the present invention, the communication control system comprises a unified messaging service to store at least one of voice and digital data to be accessed by the second user at a later time.

According to another aspect of the present invention, the transmission anomaly includes transmission delay and delay jitter. In particular, the transmission anomaly is present when the transmission delay is over approximately 150 ms and the delay jitter is over approximately 50 ms.

According to another aspect of the present invention, while communicating using the second communication option, the communication control service switches to the first communication option if the first communication option becomes feasible due to the transmission anomaly being below the predetermined levels. Preferably, the communication control service informs the first user of availability of the first communication option if the first communication option becomes feasible due to the transmission anomaly being below the predetermined levels.

In addition, in order to achieve the above object, there is provided a communication control system for communicating between a first user having a first communication device and a second user having a second communication device over a communication network. The communication control system comprises a communication option module executable in the communication control system to provide a plurality of communication options to the first user; a first user interface module executable in the communication control system to respond to requests received from the first communication device; the communication option module for selecting a first communication option from the plurality of communication options in response to a request received from the first communication device; a transmission status check module for determining whether a transmission anomaly of the communication network is over predetermined levels; the communication option module for selecting a second communication option if the transmission status check module determines that the transmission anomaly is over the predetermined levels; and a second user interface module executable in the communication control system to interface with the second communication device through a communication option determined by the communication option module.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitutes a part of this specification, illustrate embodiments of the invention and, together with the description, serves to explain the principles of the invention.

FIGS. 3a to 3c illustrate different functional web pages according to the present invention;

FIG. 7 illustrates a table showing various mails stored in a mail server according to the present invention;

DETAILED DESCRIPTION OF THE PREFERRED EMBODIMENTS

Hereinafter, the present invention will be described with respect to the preferred embodiment illustrated in the annexed drawings.

Figure 1:
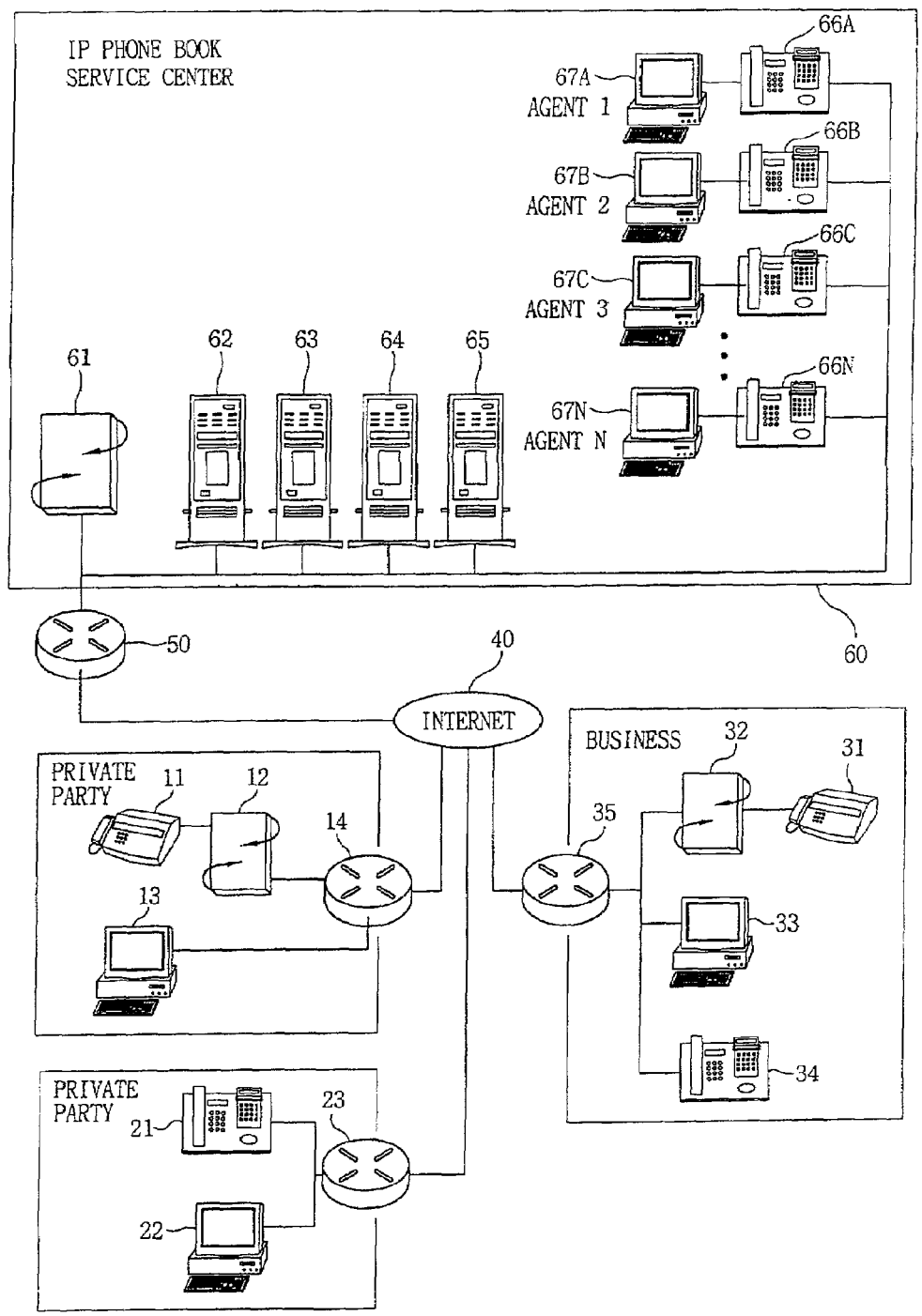
FIG. 1 is a schematic diagram of a communication system embodying the communication control system and method according to a preferred embodiment of the present invention.

FIG. 1 is a schematic diagram of a communication system embodying the communication control method according to the present invention. As illustrated, the communication control system requires communication between users and the IP phone book service center 60 through a communication medium, such as the Internet. The IP phone book service center 60 is preferably the communication control system of the present invention.

According to FIG. 1, the users are connected to the Internet 40 using various methods. For example, a user using an analog phone 11 is connected to the Internet 40 through a router 14 via a gateway 12 (also known as a media gateway). Similarly, a computer 13 is connected to the Internet through the router 14. An IP phone 21 and a computer 22 are directly connected to router 23. A computer 33 and an IP phone 34 are directly connected to router 35 while an analog phone 31 is connected via media gateway 32 to the router 35. The routers 14, 23 and 35 are connected to the IP telephone book service center 60 via router 50.

Although the present invention is described using the Internet 40, other network systems known in the art may also be used, including TCP/IP based networks (e.g., an Intranet, the Internet), LAN, Ethernet, WAN, Token Ring, etc. Alternatively, there may be separate and different networks between the components. Further, because the preferred embodiment of the communication network is the Internet 40, there can be numerous users using the Internet 40 simultaneously, however only three users are shown for illustration purposes.

Referring to FIG. 1, the IP telephone book service center 60 comprises a gateway controller 61, a web server 63, a mail server 64 and chatting server 65 in addition to an IP telephone book server 62 as well as numbers of IP telephones 66A to 66N and computers 67A to 67N operated by agents to implement and provide reservation services.

A detailed explanation of the operation of the present invention is as follows with reference to accompanying FIGS. 2 to 8. For example, a user who has an analog phone 11 and a media gateway 12 makes an IP number search request through the personal computer 13. A personal computer connected to the Internet through a browser may also perform an IP number search. Alternatively, a user who has an IP telephone 21 may requests an IP number search. Upon receiving such search request, the IP telephone book service center 60 provides an IP number search site, such as FIG. 2, so that business names, personal names or business types are preferably searched online.

Figure 2:
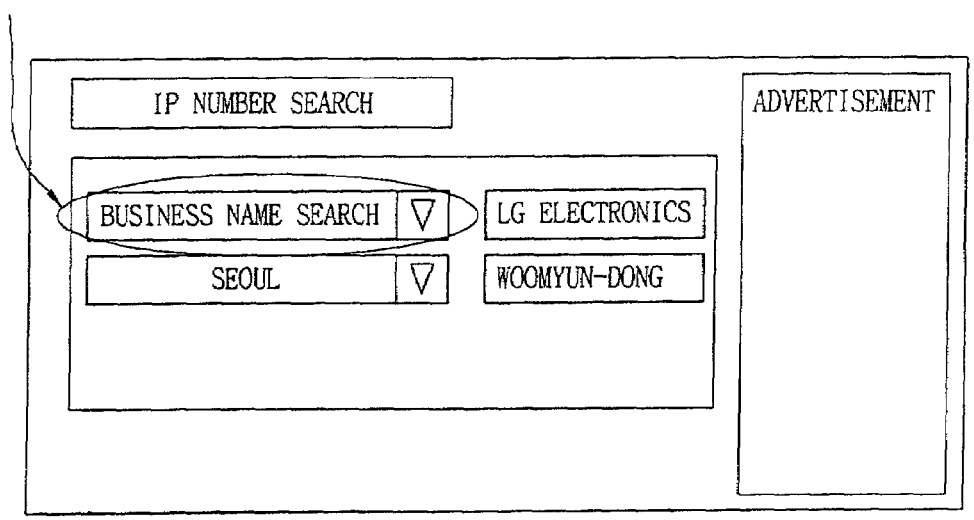
FIG. 2 illustrates an embodiment of an IP number search site according to the present invention.

Referring to FIG. 2, if the user first selects "Business Name Search" and then selects a business name he wants (e.g., LG Electronics), a web page showing the name of business, corresponding address and telephone is displayed, as illustratively shown in FIG. 3a. If the user selects a person's name, a web page showing all matched names and addresses and telephone numbers is displayed, as illustratively shown in FIG. 3b. When "Korean Restaurant" is chosen as the business type, then a web page displaying various restaurants offering Korean food is displayed, as illustratively shown in FIG. 3c. Preferably, the exemplary displays illustrated in FIGS. 3a–3c and 4 are displayed on the IP phone display.

Preferably, when the user selects either a business name, a personal name or a business type, not only the usual address and phone numbers are listed, but also the main IP (or home page URL) together with IP telephone, chatting, e-mail, fax or an item called Reservation (e.g., icon) are displayed. These functions are realized through, for example, the IP phone book server 62 of the IP phone book service center 60.

At this time, if the user selects the "IP Phone" icon, a phone conversation with the other party via the Internet 40 is enabled. If an IP phone 21 is available, the phone call through the Internet is implemented directly through the router 23. Alternatively, if the IP phone 21 is unavailable, such phone call is implemented using an analog phone 11 through the media gateway 12.

In the above situation, if the "Chatting" icon is selected, the user is connected to a chatting window and is able to chat with the other party using, for example, a chatting server 65 of the IP phone book service center 60. If the "E-mail" icon is selected, the user may write and transmit e-mail to the designated party using, for example, a mail server 64 of the IP phone book service center 60. Furthermore, if a fax transmission to the other party is desired, the documents that require transmission may be transmitted after having been converted to a graphic file (e.g., PDF, TIF, etc.). The IP telephone book service center 60 first converts the graphic file into feature file (e.g., DSP) and then transmits to the other party's fax machine.

According to the preferred embodiment of the present invention, the business type web page illustrated in FIG. 3c shows that a "Reservation" icon is provided. A user can select this icon at the web page and reserve seats for movies, plays, concerts, etc. or make reservations at restaurants or have food delivered. If a human interaction is required for making reservations, the user may utilize the assistance of the agents who are operating the personal computers 67A to 67N in the IP phone book service center 60.

The reservation function described above may be applied to various business, not limited to restaurants. Such feature is especially useful for small to medium businesses because separate agents or operators need not be hired.

Figure 4:
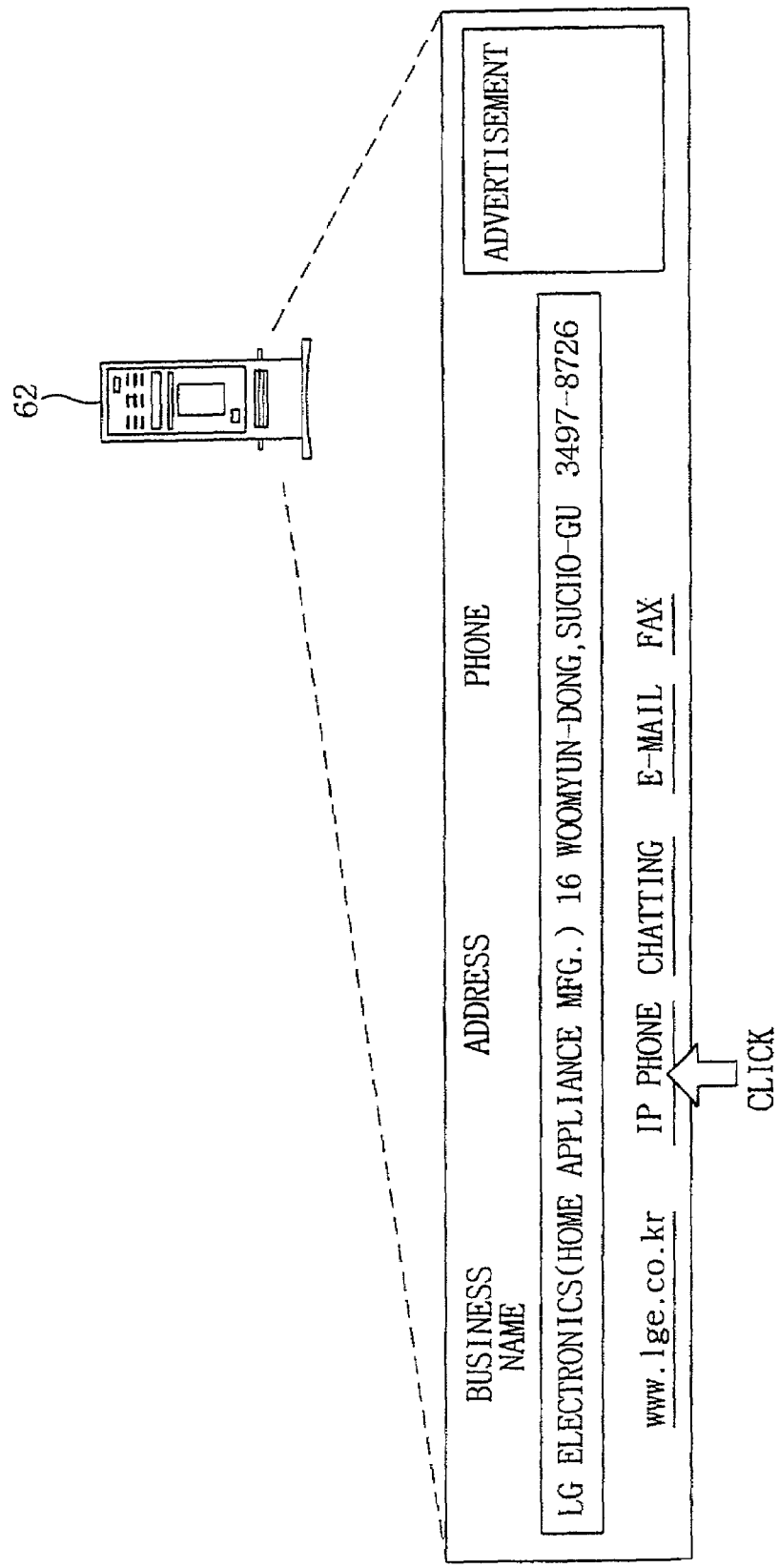
FIG. 4 illustrates the use of a server to implement the preferred embodiment of the present invention.

FIG. 4 illustrates the use of a server to implement the preferred embodiment of the present invention. Preferably, the IP phone book server 62 of the IP phone book service center 60 exclusively provides web page for IP phone book of the present invention and the related address table and address resolution function. However, other additional functions described above may also be implemented in the same server without providing additional servers. In this regard, the users select services they desire by selecting one of the user selectable icons, such as IP telephone, chatting, e-mail, fax, etc., displayed on the IP telephone book web page illustrated in FIG. 4, which is provided, for example, by the IP phone book server 62.

Figure 5:
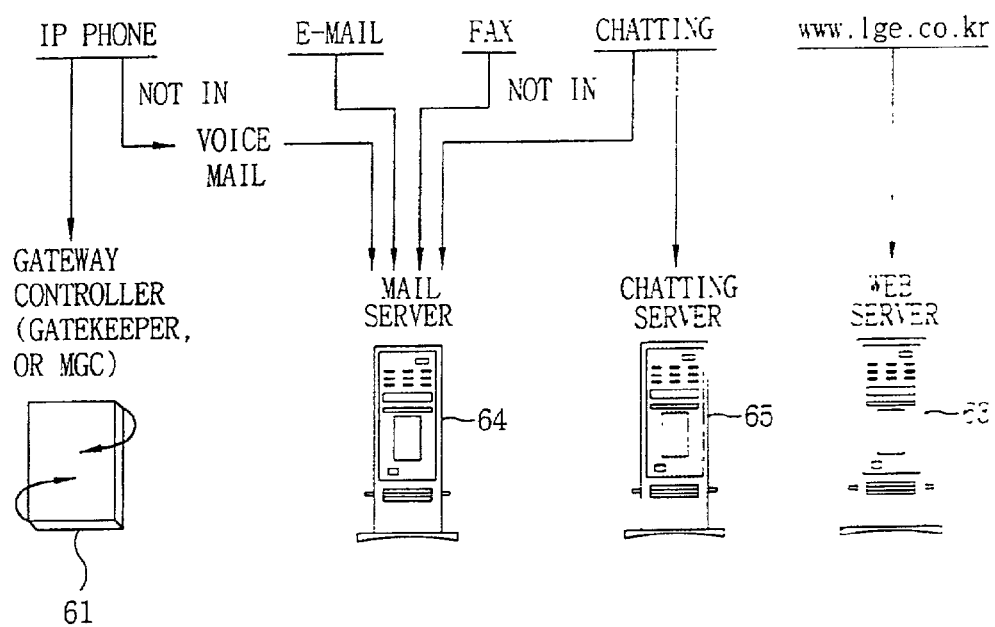
FIG. 5 illustrates a diagram classifying the servers used in an embodiment of the present invention by their functions.

The icon selection from the web site provides the user the corresponding services from the four functions classified as in FIG. 5. For the convenience of explanation, FIG. 5 classifies the servers 63 to 65 by their functions. However, a single server, for example, the IP telephone book server 62, may be programmed to incorporate all of the communication functions.

According to the present invention, to effectively operate the IP phone book service center 60 as described above, there is a need to serve the user in accordance with changing communication environment so that the user may switch and change to appropriate means of communication. The change in the communication environment, such as a data transmission speed, is caused by many factors, including, number of users and amount of data transmission on the Internet.

Figure 6:
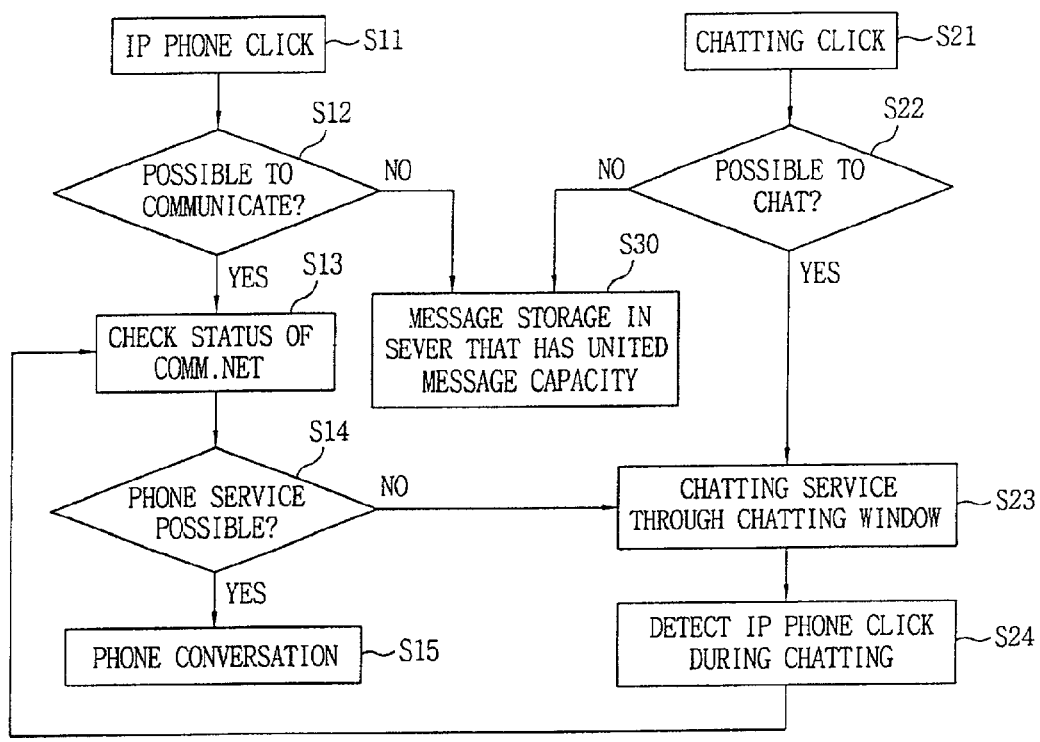
FIG. 6 illustrates a flow chart of the communication control method according to the present invention.

FIG. 6 illustrates a flow chart of the communication control method according to the present invention. Referring to FIG. 6, for example, the user selects the "IP phone" icon in step S11 on web pages shown in FIG. 3a to 3c. The IP phone book server 62 determines in step S12 whether such oral communication is possible. If the effective phone conversation with the other party is determined as not feasible (e.g., the other party is not answering), the mail server 64, which is equipped with a unified messaging system (UMS) capability, stores the caller's voice messages in step S30. Preferably, such voice messages are stored in a standard audio file format (e.g., MP3, WAV, etc.) known to one of ordinary skill in the art.

However, when the phone conversation is determined to be possible (i.e., the other party is present and online) after verification in step S12, and if the Internet data transmission status is judged to be feasible for phone conversation service in steps S13 and S14, a phone service is enabled. If the server determines that although the other party is present but oral communication is not feasible due to the Internet traffic or limitation in the communication bandwidth, the IP phone book service center 60 enables a chatting service using the chatting server 65 in step S23. In such a case, chatting function is enabled through a chatting window.

In step S14, the level of Internet traffic is verified. This is to determine whether any transmission anomaly is over predetermined levels. For example, if the conditions cannot satisfy the requirements of delay time below approximately 150 ms to 200 ms and delay jitter below approximately 50 ms, it is judged that phone conversation service is not feasible.

Referring further to FIG. 6, the user may select the chatting icon on the web page in step S21. If the feasibility for chatting with the other party is determined not possible in step S22, the user's written message is stored in the mail server 64 equipped with the UMS in step S30. Preferably, when a written message is stored in the mail server 64, the displayed contents of the chatting window prepared by the user are stored intact.

When chatting is determined to be feasible after the confirmation in step S22, chatting through the chatting window is enabled in step S23. During chatting, the user may select the IP phone icon in step S24. In such event, the server determines the feasibility of the telephone communication in step S13. If the telephonic communication is feasible, the server enables a phone conversation function through the Internet. Alternatively, if the server determines that the voice communication is feasible due to the elimination or reduction of the transmission anomaly on the Internet, then the server preferably informs the user that such option is now available to allow the user to switch the communication mode, for example, from chatting to voice communication.

FIG. 7 illustrates various types of messages and/or mails left in the mail server 64 for the above-described reasons. In particular, the user may be shown the information of FIG. 7 on his or her computer. The display contains information pertaining to the identity of senders, mail type (whether they are voice-mails, e-mails, chatting or faxes, etc.) and the time and date of such information.

Figure 8:
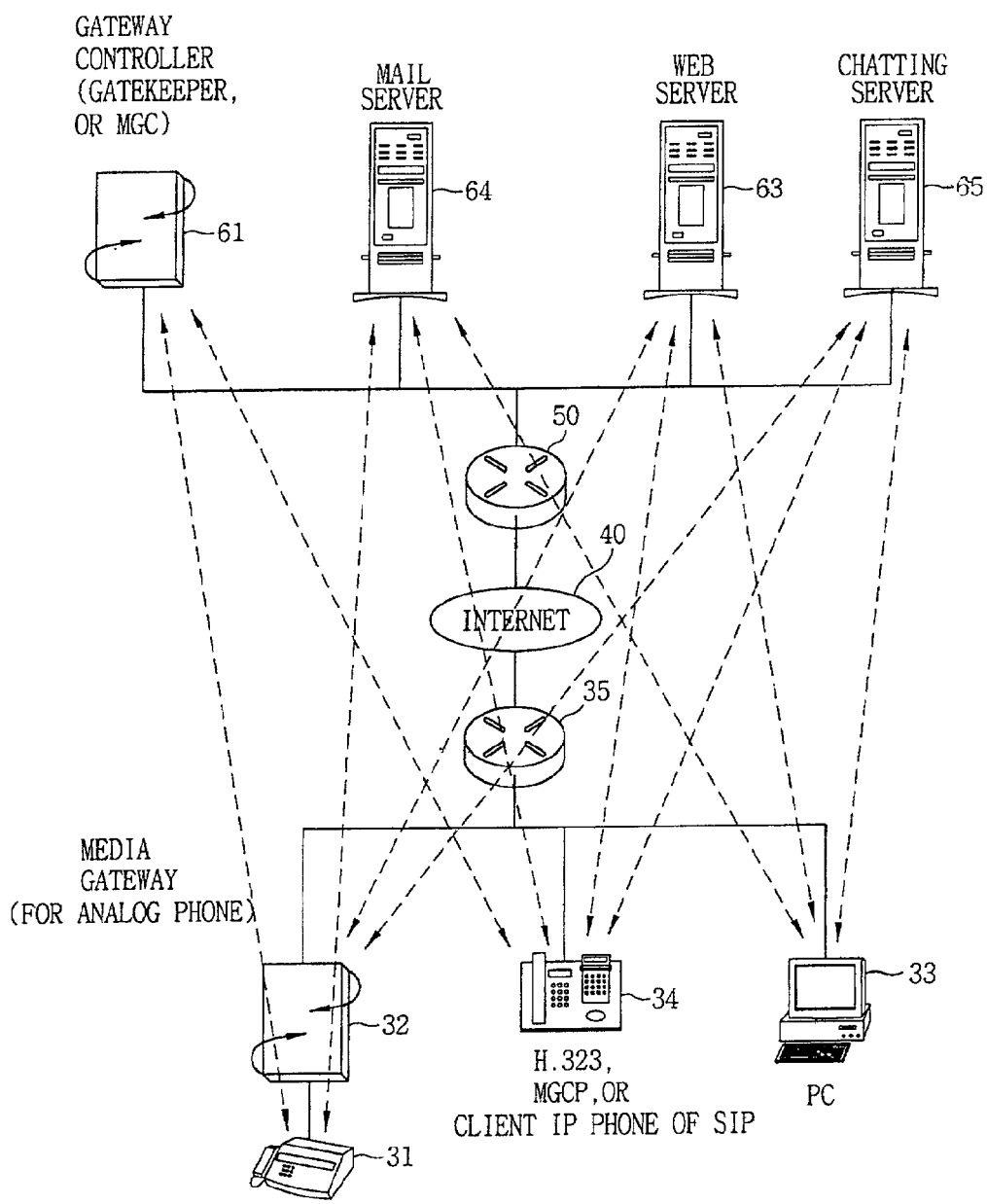
FIG. 8 illustrates a schematic diagram for each communication path connected to the servers according to the present invention.

FIG. 8 illustrates each of the communication paths to the corresponding servers 63, 64 and 65 the user goes through after the user is connected to the Internet 40 through the routers 35 and 50 in order to receive desired services. Each of the servers 63, 64 and 65 interfaces with user equipment 31, 33 or 34 through a standard (e.g. SIP, H323, MGCP, etc.) or a custom protocol. However, if the user wants to check mail through the analog phone 31 or IP telephone 34, a direct connection to the mail server 64 has to be established.

Figure 9:
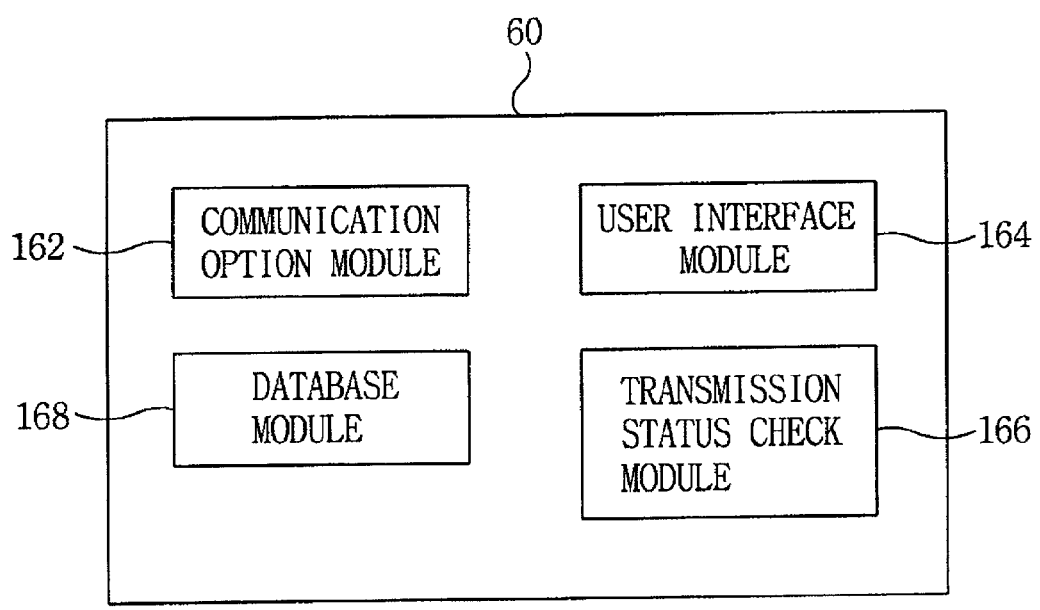
FIG. 9 illustrates software components in the preferred embodiment of the IP telephone book service center shown in FIG. 1.

FIG. 9 illustrates software components in the preferred embodiment of the IP telephone book service center 60 shown in FIG. 1. The components include a communication option module 162 for providing a plurality of communication options, such voice communicating, chatting, e-mail and fax, and a user interface module 164 for interfacing with users. For example, the user interface module 164 responses to requests received from an IP phone or a computer of a first user and provides interface with another IP phone or computer of a second user. The software component further includes a transmission status check module 166 for determining whether a transmission anomaly of the Internet is over the predetermined levels. If there is anomaly, then the communication option module 162 switches the method of communication in response to the output from the transmission status check module 166. There is also a database module 168 for storing and accessing various database information, such as user names, identifications passwords, etc.

Preferably, the proprietor who operates the IP phone book service center 60 as described above may sell the advertisement spaces on the screen as an income source. Of course, in case when a large number of hits and IP numbers are secured, fees may be collected from those businesses registered on the name or type of business categories. However, considering the characteristics of Internet services, it would be more important to secure a large number of businesses by operating the service for free.

Another source of income for the proprietor who operates the IP phone book service center 60 is additional services. For example, when a business utilize additional services such as the reservation functions, such business should be able to reduce its manpower and, thus it would be fair and proper for such business to share the cost.

Further, taking into consideration problems facing general businesses in hiring their own separate agents due to costs and other factors, the IP telephone book service center 60 may provide agent services, services storing voice, fax and e-mail messages or automatic answering services and then invoice them for a cost.

As described above, the present invention provides easy communication service to the general public who does not have any special knowledge of computers. By offering choices of communication and access platforms, such as IP phone, chatting, e-mail or fax through a web site, users can easily communicate with a target using preferred and alternative communication methods.

Moreover, the present invention undertakes the task of verifying the communication status and condition and offers a choice of communication suited for such environment. As a result, the most suitable method of communication, such as voice, chatting, e-mail, etc., is provided.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method of communicating between a first user having a first communication device and a second user having a second communication device using a communication control system over a communication network, wherein the communication control system provides a plurality of communication options, the method comprising the steps of:
   the communication control system receiving from the first communication device a request indicating that the first user has requested contacting the second user through the communication network using a first communication option from the plurality of communication options;
   the communication control system interfacing with the second communication device to determine whether the second communication device is available to communicate using the first communication option;
   the communication control system checking transmission delay of the communication network to determine whether an optimum communication may be achieved using the first communication option; and
   the communication control system communicating with the second communication device using a second communication option if the first communication option is not feasible due to a transmission anomaly being over a predetermined levels;
   wherein the transmission anomaly includes transmission delay and delay jitter;
   wherein the transmission anomaly is present when the transmission delay is over approximately 150 ms and the delay jitter is over approximately 50 ms.

2. The method of claim 1, wherein the communication control system provides a web site with a search engine to provide information pertaining to the second user including the plurality of communication options to contact the second user.

3. The method of claim 1, wherein the communication control system comprises a unified messaging service to store at least one of voice and digital data to be accessed by the second user at a later time.

4. The method of claim 1, wherein the plurality of communication options comprises audio communication, chatting, e-mail and fax.

5. The method of claim 1, wherein the first and the second communication devices are at least one of IP phone, analog telephone and computer.

6. The method of claim 5, wherein the analog telephone is connected to the communication network through a media gateway.

7. The method of claim 1, further comprising the communication control service providing a reservation service capable of being displayed on and chosen by the first user using the first communication device.

8. The method of claim 1, wherein the first communication option is a voice communication and the second communication option is chatting.

9. The method of claim 1, wherein while communicating using the second communication option, the communication control service switches to the first communication option if the first communication option becomes feasible due to the transmission anomaly being below the predetermined levels.

10. The method of claim 1, wherein while communicating using the second communication option, the communication control service informs the first user of availability of the first communication option if the first communication option becomes feasible due to the transmission anomaly being below the predetermined levels.

11. A communication control system for communicating between a first user having a first communication device and a second user having a second communication device over a communication network, the communication control system comprising:
- a communication option module executable in the communication control system to provide a plurality of communication options to the first user;
- a first user interface module executable in the communication control system to respond to requests received from the first communication device;
- the communication option module for selecting a first communication option from the plurality of communication options in response to a request received from the first communication device;
- a transmission status check module for determining whether a transmission anomaly of the communication network is over predetermined levels;
- the communication option module for selecting a second communication option if the transmission status check module determines that the transmission anomaly is over the predetermined levels; and
- a second user interface module executable in the communication control system to interface with the second communication device through a communication option determined by the communication option module.

wherein the transmission anomaly includes transmission delay and delay jitter;

wherein the transmission anomaly is present when the transmission delay is over approximately 150 ms and the delay jitter is over approximately 50 ms.

12. The communication control system of claim 11, wherein the communication control system provides a web site with a search engine to provide information pertaining to the second user including the plurality of communication options to contact the second user.

13. The communication control system of claim 11, wherein the communication control system comprises a unified messaging service to store at least one of voice and digital data to be accessed by the second user at a later time.

14. The communication control system of claim 11, wherein the plurality of communication options comprises audio communication, chatting, e-mail and fax.

15. The communication control system of claim 11, wherein the first and the second communication devices are at least one of IP phone, analog telephone and computer.

16. The communication control system of claim 15, wherein the analog telephone is connected to the communication network through a media gateway.

17. The communication control system of claim 11, further comprising the communication control service providing a reservation service capable of being displayed on and chosen by the first user using the first communication device.

18. The communication control system of claim 11, wherein the first communication option is voice communication and the second communication option is chatting.

19. The communication control system of claim 11, wherein while communicating using the second communication option, the communication option module switches to the first communication option if the first communication option becomes feasible due to the transmission anomaly being below the predetermined levels.

20. The communication control system of claim 11, wherein while communicating using the second communication option, the communication option module informs the first user of availability of the first communication option if the first communication option becomes feasible due to the transmission anomaly being below the predetermined levels.

21. A communication system for communicating between a first user and a second user through a communication network, the communication system comprising:
- a first communication device operable by the first user connected to the communication network;
- a second communication device connected to the communication network;
- a communication control system connected to the communication network comprising:
  - a communication option module executable in the communication control system to provide a plurality of communication options to the first user;
  - a first user interface module executable in the communication control system to respond to requests received from the first communication device;
  - the communication option module for selecting a first communication option from the plurality of communication options in response to a request received from the first communication device;
  - a transmission status check module for determining whether a transmission anomaly of the communication network is over predetermined levels;
  - the communication option module for selecting a second communication option if the transmission status check module determines that the transmission anomaly is over the predetermined levels; and
  - a second user interface module executable in the communication control system to interface with the second communication device through a communication option determined by the communication option module;

wherein the transmission anomaly includes transmission delay and delay jitter;

wherein the transmission anomaly is present when the transmission delay is over approximately 150 ms and the delay jitter is over approximately 50 ms.

* * * * *